United States Patent [19]
Mori et al.

[11] 3,767,435
[45] Oct. 23, 1973

[54] RAPID HARDENING PORTLAND CEMENT CLINKER COMPOSITION

[75] Inventors: Shigejiro Mori, Kawasaki; Hiroshi Uchikawa, Funabashi; Shunichiro Uchida, Tokyo, all of Japan

[73] Assignee: Onoda Cement Company, Ltd., Onoda-shi, Yamaguchi, Japan

[22] Filed: Dec. 15, 1971

[21] Appl. No.: 208,069

[30] Foreign Application Priority Data
Dec. 28, 1970 Japan.............................. 45/120520

[52] U.S. Cl..................... 106/89, 106/100, 106/104
[51] Int. Cl................................................ C04b 7/02
[58] Field of Search...................... 106/89, 315, 100, 106/104

[56] References Cited
UNITED STATES PATENTS
3,628,973  12/1971  Greening ............................. 106/89

Primary Examiner—James E. Poer
Attorney—Norman F. Oblon et al.

[57] ABSTRACT

A rapid hardening portland cement comprising 40 – 60 percent by weight of $11CaO \cdot 7Al_2O_3 \cdot CaF_2$ phase and 30 – 50 percent by weight of $3CaO \cdot SiO_2$ solid solution phase as the main mineral composition thereof and a process for manufacturing it.

4 Claims, 8 Drawing Figures

RAPID HARDENING PORTLAND CEMENT CLINKER COMPOSITION

This invention relates to rapid hardening portland cement clinker composition containing calcium fluo-aluminate represented by $11CaO \cdot 7Al_2O_3 \cdot CaF_2$ (hereinafter abridged as $C_{11}A_7 \cdot CaF_2$).

An object of this invention is to provide clinker for producing rapid hardening portland cement which, after mixing with water, has a rapid hardening rate, a short but controllable initial setting time and the high compressive and bending strength both at short and longer period by adding anhydrite and hemihydrate thereto.

Further and additional objects of this invention will appear from the following description.

The hardening rate or the strength of cement is generally greatly affected by the compound composition: that is, $CaO \cdot Al_2O_3$ (hereinafter abridged as CA) and $12CaO \cdot 7Al_2O_3$ (hereinafter abridged as $C_{12}A_7$) have active hydraulic property and they set fast; therefore, it has been attempted to use the clinker containing CA and $C_{12}A_7$ phase for obtaining the high initial strength of cement and the clinker containing $3CaO \cdot SiO_2$ solid solution phase (hereinafter abridged ae $C_2S$) and $2CaO \cdot SiO_2$ solid solution phase (hereinafter abridged as $C_2S$) are utilized to obtain the high early and later strength of cement. In order to obtain the cement having good strength development for all stage from initial to early and later, many workers have tried to use the mixture of aluminous cement clinker containing CA and $C_{12}A_7$ and portland cement clinker containing $C_3S$ and $C_2S$. However, it is difficult to control setting time, in such a mixed cement, and in some cases it sets very rapidly, in other case it sets hardly. Even in the case that high initial strength of the cement can be developed satisfactorily, hexagonal calcium aluminate hydrate thereof transfers gradually to cubic $3CaO \cdot Al_2O_3 \cdot 6H_2O$ accompanying with the reduction of strength which bring collapse and thus mixing of above-mentioned both cement clinkers has been thought to be harmful for setting and hardening.

The present inventors have found that even if mixed raw materials is under the high lime concentration $C_{11}A_7 \cdot CaF_2$ is formed as a stable phase, instead of $C_3A$ in the burned clinker when fluoride such as fluorite is added to mixed raw material.

So they prepared various kinds of rapid hardening portland cement from the clinkers which contain $C_{11}A_7 \cdot CaF_2$ phase, $C_3S$, $C_2S$ and $2CaO \cdot Fe_2O_3$—$6CaO \cdot 2Al_2O_3 \cdot Fe_2O_3$. solid solution phase (hereinafter abridged as $C_4AF$), and studied a method of the regulation of the setting time and a development of the high intital and later strength. As the result, there was found out that the cement produced from the clinker containing 40–60percent by weight of $C_{11}A_7 \cdot CaF_2$ and 30–50 percent by weight of $C_3S$ showed the high initial and later strength, and only in the case when the content of $Fe_2O_3$ in clinker is less than 3.0 percent (less than about 8 percent $C_4AF$), bending strength of mortar specimen is remarkably increased.

According to this invention, gypsum adding to the clinker was preferable to be a mixture of hemihydrate and anhydrite, and the total amount thereof was the most preferable in the range of 11–21 percent by weight based on $SO_3$ in the cement and the adding ratio of hemihydrate to anhydrite is less than 0.50 by weight ratio.

The setting time could be controlled by varying above-mentioned mixing ratio.

The above-mentioned clinker containing calcium fluo-aluminate phase is produced by burning a mixture of an aluminous material, a calcareous material, a silicious material and a fluorite. The mixture comprises mainly 20–33 percent by weight of $Al_2O_3$, 7.2–15.5 percent by weight of $SiO_2$, 52–62 percent by weight of CaO, 1.3–2.6 percent by weight of F and less than 3 percent by weight of $Fe_2O_3$, which is burned at the temperature of 1240°–1360°C.

The compressive strength of the mortar, prepared from rapid hardening portland cement which is produced by adding a mixture of hemihydrate and anhydrite to the clinker obtained by this invention, was higher than about 50–200 kg/cm² at 3 hours and higher than about 100–250 kg/cm² at one day, and the bending strength of the mortar was higher than 10–30 kg/cm² at 3 hours and higher than about 30–60 kg/cm² at one day. The experimental results will be explained in detail as follows.

Figure 1:
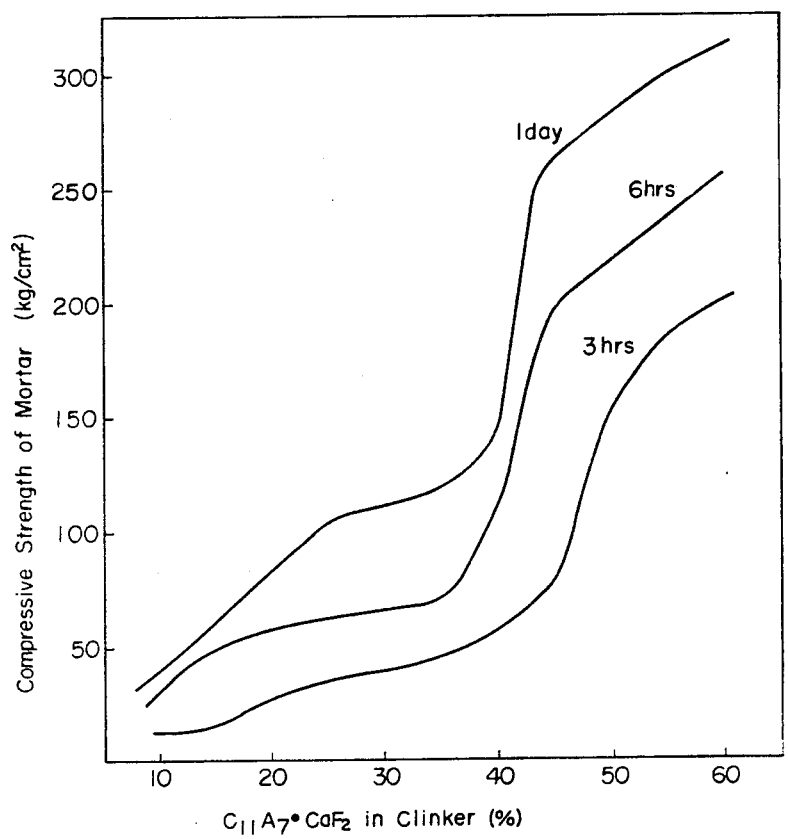
FIG. 1 shows relation between $C_{11}A_7 \cdot CaF_2$ content in clinker and the compressive strength of mortar, when $c_3S$ content in clinker was selected to be 30 percent by weight.
Figure 2:
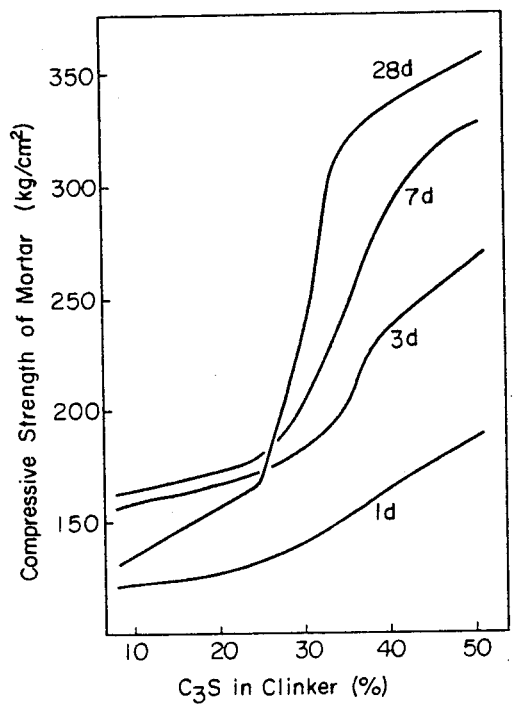
FIG. 2 to FIG. 4 show relation between $C_3S$ content in clinker and the compressive strength of mortar, when $C_{11}A_7 \cdot CaF_2$ content in clinker was selected to be 40, 50 and 60 percent by weight respectively.
Figure 3:
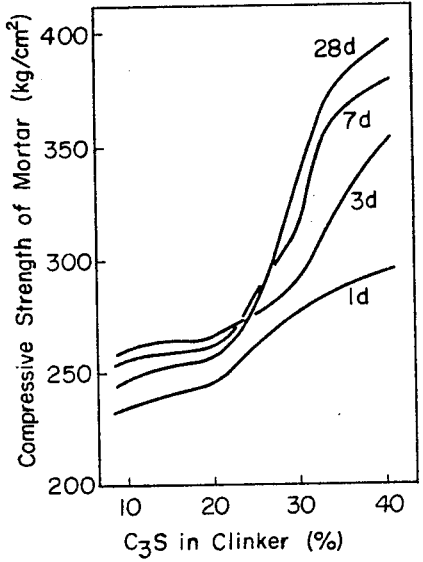
Figure 4:
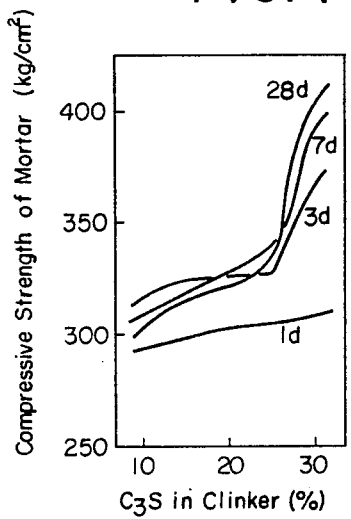
Figure 6:
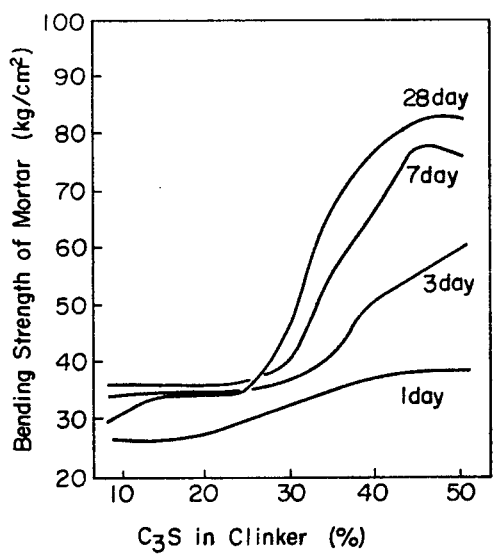
FIG. 6 shows relation between the bending strength of mortar and $C_3S$ content in clinker, when $C_{11}A_7 \cdot CaF_2$ content in clinker was selected to be 40 percent by weight.
Figure 5:
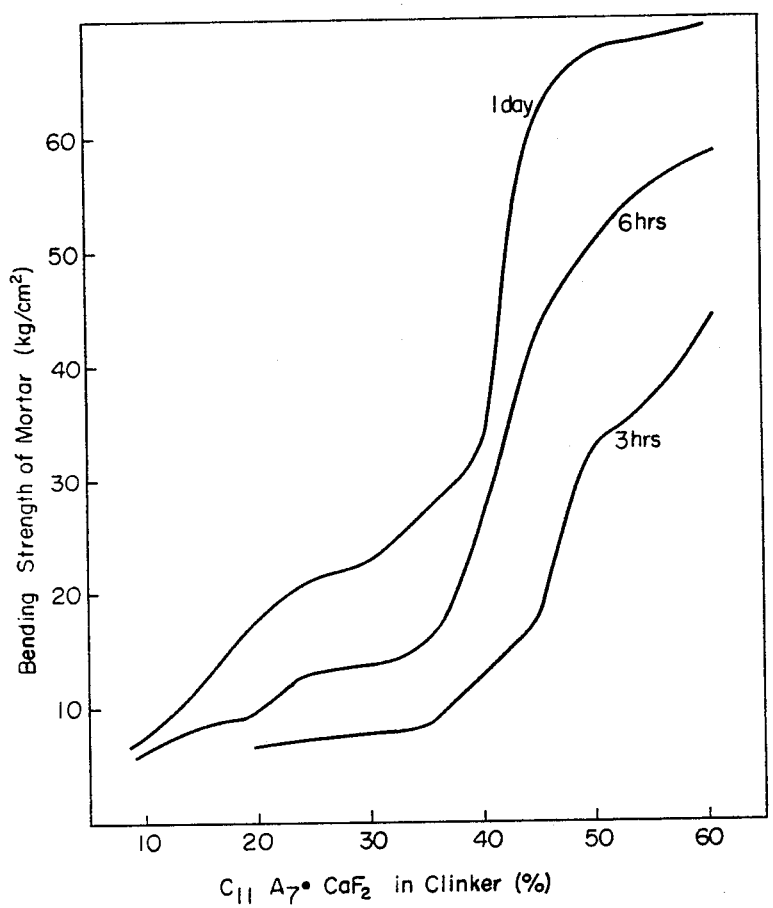
FIG. 5 shows relation between $C_{11}A_7 \cdot CaF_2$ content in clinker and the bending strength of mortar, when $C_3S$ content in clinker was selected to be 30 percent by weight.
Figure 7:
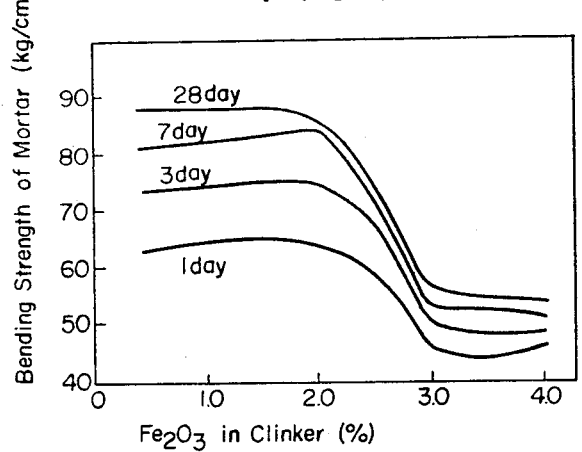
Figure 8:
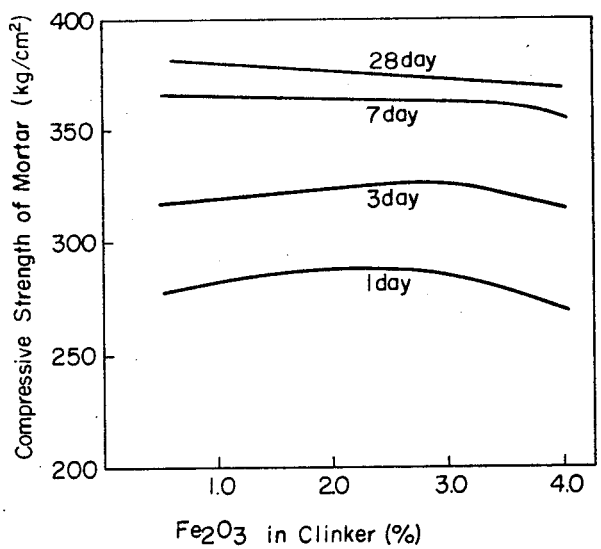

FIG. 7 and 8 show relation between $Fe_2O_3$ content in clinker and the bending strength of mortar, and between $Fe_2O_3$ content and the compressive strength of mortar, when the clinker contained 50 percent by weight of $C_{11}A_7 \cdot CaF_2$ and 35 percent by weight of $C_3S$.

As the mixed raw materials producing the clinker pure chemicals were mixed so as to obtain the mineral composition shown in Table 1, ground in a porcelain potmill, shaped under pressure of 200 kg/cm² to form the flake of 1×4×6cm, and burned at the temperature of 1310°–1350°C in large siliconite electric furnace so as to prepare clinker containing less than 0.5 percent by weight of F·CaO. The obtained clinker was ground in a ball mill to have Blaine specific surface area of 3700 cm²/g, and a mixture of hemihydrate and anhydrite was added to the powdered clinker so that the prepared cement set in about 15 minutes after mixing with water. The mortar strength test of the cement was tried out according to JIS R 5201 Testing Method.

In Table 2 and 3, there were list up the mortar strength at aged 3, 6 hours and 1 day when $C_3S$ content in clinker was kept a constant value of 30 percent by weight, but $C_{11}A_7 \cdot CaF_2$ content in clinker was varied, and the mortar strength at aged 1 day and longer when $C_{11}A_7 \cdot CaF_2$ content in clinker was kept constant but $C_3S$ content was varied.

TABLE 1

| No. | Mineral composition of clinker (percent by weight) | | | | Chemical composition (percent by weight) | | | | | | | | |
|---|---|---|---|---|---|---|---|---|---|---|---|---|---|
| | $C_3S$ | $C_2S$ | $C_{11}A_7 \cdot CaF_2$ | $C_4AF$ | $SiO_2$ | $Al_2O_3$ | $Fe_2O_3$ | CaO | MgO | $K_2O$ | $Na_2O$ | F | Total |
| 1 | 30 | 50.8 | 10 | 6.1 | 25.5 | 6.3 | 2.0 | 64.3 | 0.5 | 0.3 | 0.2 | 0.8 | 100.0 |
| 2 | 30 | 45.9 | 15 | 6.1 | 23.9 | 8.9 | 2.0 | 63.2 | 0.5 | 0.3 | 0.2 | 1.0 | 100.0 |
| 3 | 30 | 40.7 | 20 | 6.1 | 22.1 | 11.4 | 20. | 62.5 | 0.5 | 0.3 | 0.2 | 1.1 | 100.0 |
| 4 | 30 | 35.6 | 25 | 6.1 | 20.3 | 14.0 | 2.0 | 61.5 | 0.5 | 0.3 | 0.2 | 1.2 | 100.0 |
| 5 | 30 | 30.4 | 30 | 6.1 | 18.5 | 16.5 | 2.0 | 60.6 | 0.5 | 0.3 | 0.2 | 1.4 | 100.0 |
| 6 | 30 | 25.5 | 35 | 6.1 | 16.8 | 19.0 | 2.0 | 59.7 | 0.5 | 0.3 | 0.2 | 1.5 | 100.0 |
| 7 | 30 | 20.4 | 40 | 6.1 | 15.0 | 21.6 | 2.0 | 58.8 | 0.5 | 0.3 | 0.2 | 1.6 | 100.0 |
| 8 | 30 | 15.2 | 45 | 6.1 | 13.2 | 24.1 | 2.0 | 57.9 | 0.5 | 0.3 | 0.2 | 1.8 | 100.0 |
| 9 | 30 | 10.3 | 50 | 6.1 | 11.5 | 26.6 | 2.0 | 57.0 | 0.5 | 0.3 | 0.2 | 1.9 | 100.0 |
| 10 | 30 | 4.9 | 55 | 6.1 | 9.6 | 29.2 | 2.0 | 56.1 | 0.5 | 0.3 | 0.2 | 2.1 | 100.0 |
| 11 | 30 | 0 | 60 | 6.1 | 7.9 | 31.7 | 2.0 | 55.2 | 0.5 | 0.3 | 0.2 | 2.2 | 100.0 |
| 12 | 15 | 4.9 | 70 | 6.1 | 5.6 | 36.8 | 2.0 | 52.1 | 0.5 | 0.3 | 0.2 | 2.5 | 100.0 |
| 13 | 5 | 4.6 | 80 | 6.1 | 2.9 | 41.8 | 2.0 | 49.5 | 0.5 | 0.3 | 0.2 | 2.8 | 100.0 |
| 1-1 | 10 | 40.4 | 40 | 6.1 | 16.7 | 21.6 | 2.0 | 57.1 | 0.5 | 0.3 | 0.2 | 1.6 | 100.0 |
| 1-2 | 15 | 35.3 | 40 | 6.1 | 16.2 | 21.6 | 2.0 | 57.6 | 0.5 | 0.3 | 0.2 | 1.6 | 100.0 |
| 1-3 | 20 | 30.1 | 40 | 6.1 | 15.8 | 21.6 | 2.0 | 58.0 | 0.5 | 0.3 | 0.2 | 1.6 | 100.0 |
| 1-4 | 25 | 25.2 | 40 | 6.1 | 15.4 | 21.6 | 2.0 | 58.4 | 0.5 | 0.3 | 0.2 | 1.6 | 100.0 |
| 1-5 | 30 | 20.4 | 40 | 6.1 | 15.0 | 21.6 | 2.0 | 58.8 | 0.5 | 0.3 | 0.2 | 1.6 | 100.0 |
| 1-6 | 35 | 15.2 | 40 | 6.1 | 14.5 | 21.6 | 2.0 | 59.3 | 0.5 | 0.3 | 0.2 | 1.6 | 100.0 |
| 1-7 | 40 | 10.3 | 40 | 6.1 | 14.1 | 21.6 | 2.0 | 59.7 | 0.5 | 0.3 | 0.2 | 1.6 | 100.0 |
| 1-8 | 45 | 5.4 | 40 | 6.1 | 13.7 | 21.6 | 2.0 | 60.1 | 0.5 | 0.3 | 0.2 | 1.6 | 100.0 |
| 1-9 | 50 | 0 | 40 | 6.1 | 13.3 | 21.6 | 2.0 | 60.5 | 0.5 | 0.3 | 0.2 | 1.6 | 100.0 |
| 2-1 | 10 | 30.4 | 50 | 6.1 | 13.2 | 26.6 | 2.0 | 55.3 | 0.5 | 0.3 | 0.2 | 1.9 | 100.0 |
| 2-2 | 15 | 25.5 | 50 | 6.1 | 12.8 | 26.6 | 2.0 | 55.7 | 0.5 | 0.3 | 0.2 | 1.9 | 100.0 |
| 2-3 | 20 | 20.1 | 50 | 6.1 | 12.3 | 26.6 | 2.0 | 56.2 | 0.5 | 0.3 | 0.2 | 1.9 | 100.0 |
| 2-4 | 25 | 15.2 | 50 | 6.1 | 11.9 | 26.6 | 2.0 | 56.6 | 0.5 | 0.3 | 0.2 | 1.9 | 100.0 |
| 2-5 | 30 | 10.3 | 50 | 6.1 | 11.5 | 26.6 | 2.0 | 57.0 | 0.5 | 0.3 | 0.2 | 1.9 | 100.0 |
| 2-6 | 35 | 5.2 | 50 | 6.1 | 11.0 | 26.6 | 2.0 | 57.5 | 0.5 | 0.3 | 0.2 | 1.9 | 100.0 |
| 2-7 | 40 | 0.3 | 50 | 6.1 | 10.6 | 26.6 | 2.0 | 57.9 | 0.5 | 0.3 | 0.2 | 1.9 | 100.0 |
| 3-1 | 10 | 20.1 | 60 | 6.1 | 9.6 | 31.7 | 2.0 | 53.5 | 0.5 | 0.3 | 0.2 | 2.2 | 100.0 |
| 3-2 | 15 | 15.2 | 60 | 6.1 | 9.2 | 31.7 | 2.0 | 53.9 | 0.5 | 0.3 | 0.2 | 2.2 | 100.0 |
| 3-3 | 20 | 9.7 | 60 | 6.1 | 8.7 | 31.7 | 2.0 | 54.4 | 0.5 | 0.3 | 0.2 | 2.2 | 100.0 |
| 3-4 | 25 | 4.9 | 60 | 6.1 | 8.3 | 31.7 | 2.0 | 54.8 | 0.5 | 0.3 | 0.2 | 2.2 | 100.0 |
| 3-5 | 30 | 0 | 60 | 6.1 | 7.9 | 31.7 | 2.0 | 55.2 | 0.5 | 0.3 | 0.2 | 2.2 | 100.0 |

TABLE 2

| No. | Mineral composition of clinker (percent by weight) | | Mortar strength (kg/cm²) | | | Mortar setting time (min.) | |
|---|---|---|---|---|---|---|---|
| | $C_3S$ | $C_{11}A_7 \cdot CaF_2$ | 3 h. | 6 h. | 1 day | Initial | Final |
| 1 | 30 | 10 | 12.4 (—) | 29.8 (6.4) | 39.7 (7.3) | 16 | 21 |
| 2 | 30 | 15 | 14.9 (—) | 49.5 (8.5) | 60.0 (2.2) | 15 | 23 |
| 3 | 30 | 20 | 27.6 (6.9) | 55.1 (9.4) | 82.2 (17.6) | 16 | 21 |
| 4 | 30 | 25 | 35.0 (7.5) | 63.8 (13.4) | 102 (21.6) | 14 | 20 |
| 5 | 30 | 30 | 37.3 (7.8) | 67.3 (14.0) | 111 (22.8) | 15 | 21 |
| 6 | 30 | 35 | 45.0 (8.3) | 68.4 (15.1) | 118 (27.4) | 15 | 21 |
| 7 | 30 | 40 | 57.8 (12.9) | 110 (26.6) | 141 (32.2) | 16 | 24 |
| 8 | 30 | 45 | 103 (17.5) | 198 (42.5) | 264 (61.2) | 14 | 20 |
| 9 | 30 | 50 | 150 (32.9) | 212 (50.5) | 278 (67.8) | 15 | 20 |
| 10 | 30 | 55 | 184 (36.8) | 238 (55.6) | 297 (68.2) | 15 | 20 |
| 11 | 30 | 60 | 201 (43.3) | 252 (57.8) | 309 (69.3) | 15 | 20 |
| 12 | 15 | 70 | 482 (98.5) | 513 (103) | 507 (101) | 16 | 21 |
| 13 | 5 | 80 | 496 (97.6) | 516 (106) | 488 (98.8) | 14 | 19 |

TABLE 3

| No. | Mineral Composition of Clinker (% by weight) | | Mortar Strength (kg/cm²) | | | |
|---|---|---|---|---|---|---|
| | $C_3S$ | $C_{11}A_7 \cdot CaF_2$ | 1 day | 3 day | 7 day | 28 day |
| 4-1 | 10 | 40 | 123 (26.7) | 159 (34.6) | 164 (36.4) | 136 (30.9) |
| 4-2 | 15 | " | 125 (26.7) | 163 (34.7) | 169 (35.9) | 144 (35.0) |
| 4-3 | 20 | " | 128 (27.8) | 168 (34.9) | 172 (36.7) | 160 (34.7) |
| 4-4 | 25 | " | 133 (30.1) | 172 (35.6) | 178 (35.8) | 166 (34.5) |
| 4-5 | 30 | " | 141 (32.2) | 181 (36.7) | 202 (40.4) | 243 (45.6) |
| 4-6 | 35 | " | 152 (33.8) | 201 (41.6) | 242 (50.9) | 313 (72.8) |
| 4-7 | 40 | " | 165 (37.3) | 234 (56.3) | 286 (66.5) | 333 (74.0) |
| 4-8 | 45 | " | 174 (38.3) | 250 (55.6) | 311 (77.0) | 344 (81.9) |
| 4-9 | 50 | " | 187 (38.5) | 264 (60.0) | 325 (75.6) | 354 (82.3) |
| 5-1 | 10 | 50 | 235 | 261 | 256 | 247 |
| 5-2 | 15 | " | 240 | 263 | 259 | 253 |
| 5-3 | 20 | " | 244 | 263 | 261 | 256 |
| 5-4 | 25 | " | 261 | 277 | 285 | 280 |
| 5-5 | 30 | " | 278 | 291 | 314 | 330 |
| 5-6 | 35 | " | 288 (65.0) | 323 (75.1) | 365 (84.9) | 379 (85.8) |
| 5-7 | 40 | " | 295 | 350 | 378 | 394 |
| 6-1 | 10 | 60 | 294 | 317 | 310 | 303 |
| 6-2 | 15 | " | 299 | 325 | 320 | 316 |
| 6-2 | 20 | " | 35 | 326 | 329 | 323 |
| 6-4 | 25 | " | 307 | 327 | 341 | 334 |
| 6-5 | 30 | " | 309 | 368 | 394 | 405 |

| 12 | 15 | 70 | 507 | 480 | 469 | 472 |
| 13 | 5 | 80 | 488 | 455 | 448 | 447 |

Note: Figures show values of the compressive strength. Figures in the parenthesis show the bending strength.

According to the results described above, the initial compressive strength of the cement produced by the clinker containing more then 40 percent by weight of $C_{11}A_7 \cdot CaF_2$ obviously increased and was higher than 200 kg/cm² at aged 3 hours. The initial compressive strength development of the cement produced by the clinker containing more than 60 percent by weight of $C_{11}A_7 \cdot CaF_2$ increased remarkably, but the strength development at 3 days and longer tended to reduce, to show undesirable behaviour as cement for building. (See FIG. 1 to FIG. 4)

As to $C_3S$ content in clinker, when it was more than 30 percent by weight, the strength of the cement after 1 day developed highly, and the strength development at 7 and 28 days was remarkably. (See FIG. 2 to FIG. 4)

As to the bending strength, it was observed that the bending strength of the cement produced by the clinker containing more than 40 percent by weight of $C_{11}A_7 \cdot CaF_2$, more than 30 percent of $C_3S$ and less than 3 percent by weight of $Fe_2O_3$, developed highly. (See FIG. 5 to FIG. 8)

By selecting the clinker composition as described in this invention, the high initial and later compressive strength and bending strength of the cement produced by the clinker, can be obtained.

The effect of this invention can be recognized only with the composition of clinker, but even if the same cement composition as that of cement produced from the clinker of the invention is prepared by mixing normal portland cement clinker and the clinker containing enriched $C_{11}A_7 \cdot CaF_2$ phase, the above-mentioned effect can not be expected from the cement obtained. For example, in case of the clinker composition, in which 45 percent by weight of $C_{11}A_7 \cdot CaF_2$ and 40 percent by weight of $C_3S$ are prepared by mixing the clinker containing about 80 percent by weight of $C_{11}A_7 \cdot CaF_2$ and high eary strength portland cement clinker, the compressive strength of the cement produced from the clinker is measured as follows.

TABLE 4

| age | 3h | 6h | 1d | 3d | 7d | 28d |
|---|---|---|---|---|---|---|
| compressive strength (kg/cm²) | 184 | 184 | 183 | 133 | 121 | 114 |

As seen in Table 4, the compressive strength is found to descend gradually with time.

Some examples are shown below, and the chemical composition of raw materials used in the examples are the same as that shown in Table 5.

EXAMPLE 1

Lime stone, white clay bauxite, copper slag and fluorite having the chemical compositions shown in Table 5 were ground separately, and mixed to make the chemical composition shown in Table 6 No. 1. The mixed raw materials were shaped with a pan pelletizer, and the pellets were continuously fed to a small-scaled rotary kiln having 60cm in diameter and 8m in length and burned at the clinker temperature of 1300°–1340°C in the burningzone to produce clinker. The obtained clinker contained the mineral composition shown in Table 6 No. 1 and formation of $C_3A$ was hardly observed by X-ray diffraction analysis.

The clinker was ground, to which hemihydrate and anhydrite having the chemical composition shown in Table 7 were added amounts shown in Table 8, No. 1 to prepare rapid hardening portland cement. The cement mortar test thereof was carried out according to JIS R 5201 – 1964 and the results shown in Table 8 No. 1 were obtained.

TABLE 5

| Raw material | Ig.loss | SiO₂ | Al₂O₃ | Fe₂O₃ | CaO | MgO | SO₃ | Na₂O | K₂O | TiO₂ | ZnO | F | Total | Residue of the 88μ sieve (percent) |
|---|---|---|---|---|---|---|---|---|---|---|---|---|---|---|
| White clay | 4.3 | 73.8 | 20.3 | 0.3 | 0.5 | 0.1 | | 0.2 | 0.3 | | | | 99.8 | 1.1 |
| Limestone | 42.2 | 0.7 | 0.8 | .1 | 56.0 | .2 | | | | | | | 100.0 | 1.8 |
| Quick lime | 4.5 | 4.1 | 1.2 | .7 | 88.5 | 1.0 | | | | | | | 100.0 | 1.6 |
| Bauxite | 0.4 | 10.0 | 85.9 | 1.2 | tr. | 0.1 | | 0.1 | 0.1 | 2.7 | | | 100.5 | 1.2 |
| Fluorite | 6.1 | 23.1 | 4.1 | 1.6 | 44.1 | 1.2 | | .1 | .7 | | | 23.4 | 104.4 | |
| Copper slag | | 35.7 | 4.6 | 42.9 | 7.7 | 1.6 | 1.8 | .2 | .4 | | 5.7 | | 100.6 | 2.0 |

TABLE 6

| No. | Chemical component (percent) | | | | | | | | | | | | | Clinker mineral (percent) | | |
|---|---|---|---|---|---|---|---|---|---|---|---|---|---|---|---|---|
| | Ig. loss | Insol | SiO₂ | Al₂O₃ | Fe₂O₃ | CaO | MgO | Na₂O | K₂O | SO₃ | F | TiO₂ | Total | F CaC | C₃S | C₁₁A₇·CaF₂ |
| 1 | 0.4 | 0.2 | 13.1 | 22.5 | 2.1 | 58.8 | 0.6 | 0.08 | 0.07 | 0.3 | 1.3 | 0.6 | 100.0 | 0.3 | 39 | 41 |
| 2 | .3 | .2 | 9.4 | 28.4 | 1.8 | 56.2 | .5 | .10 | .08 | .4 | 1.9 | .8 | 100.1 | .3 | 34 | 54 |
| 3 | .3 | .2 | 10.9 | 25.3 | 2.5 | 57.9 | .5 | .07 | .09 | .3 | 1.8 | .6 | 100.5 | .4 | 49 | 46 |

TABLE 7

| | Ig.loss (percent) | SiO₂ (percent) | A₂O₃+Fe₂O₃ (percent) | CaO (percent) | MgO (percent) | SO₃ (percent) | Total (percent) |
|---|---|---|---|---|---|---|---|
| Natural anhydrite | 2.6 | 7.1 | 3.3 | 34.9 | 2.1 | 49.5 | 99.4 |
| Hemihydrate* | 6.1 | 1.8 | 0.9 | 37.5 | 0.2 | 53.6 | 100.1 |

*Prepared from natural gypsum by dehydration.

TABLE 8

| No. | Specific gravity | Fineness Blain specific surface area (cm.²/g.) | Fineness Residue of 88μ sieve (percent) | Setting Initial (min.) | Setting Final (min.) | Stability | Bending strength (kg./cm.²) 3 h. | 6 h. | 1 day | 3 day | 7 day | 28 day | Comprehensive strength (kg./cm.²) 3 h. | 6 h. | 1 day | 3 day | 7 day | 28 day | Adding amount of gypsum (percent) Anhydrite | Hemihydrite |
|---|---|---|---|---|---|---|---|---|---|---|---|---|---|---|---|---|---|---|---|---|
| 1 | 3.00 | 3750 | 1.2 | 17 | 28 | Good | 28.4 | 34.4 | 36.6 | 64.9 | 69.7 | 75.1 | 98 | 124 | 172 | 254 | 298 | 334 | 22.0 | 2.5 |
| 2 | 2.98 | 3500 | 1.5 | 19 | 30 | Good | 37.6 | 50.1 | 64.9 | 70.6 | 74.5 | 79.3 | 169 | 225 | 278 | 309 | 324 | 355 | 24.0 | 3.0 |
| 3 | 3.00 | 4380 | 0.4 | 12 | 18 | Good | 30.4 | 35.6 | 57.7 | 66.7 | 80.5 | 82.3 | 128 | 163 | 246 | 285 | 374 | 421 | 22.5 | 3.0 |

EXAMPLE 2

Quick lime, white clay, bauxite, copper slag and fluoride having the chemical composition shown in Table 5 were mixed to make the raw materials having the chemical composition shown in Table 6 No. 2. After shaping the mixed raw materials to flake 1cm in thickness by a roll pressurizing machine, the flakes were burned at the clinker temperature of 1290° – 1320°C in the burning zone to produce clinker.

The obtained clinker contained the mineral composition shown in Table 6 No. 2 and $C_3A$ was hardly contained.

Gypsum was added amounts shown in Table 8 No. 2 to the clinker and the properties of the produced cement are shown in Table 8 No. 2.

EXAMPLE 3

The mixed raw materials were prepared so as to make the chemical composition of clinker as shown in Table 6 No. 3 and was treated similarly as described in Example 2. The obtained clinker contained the mineral composition shown in Table 6 No. 3, but $C_3A$ was not contained.

Gypsum was added amounts shown in Table 8 No. 3 to the clinker and the mortar test of the cement was tried out; the results are shown in Table 8 No. 3.

What is claimed is:

1. A rapid hardening cement clinker consisting essentially of 40 – 60 percent by weight of $11CaO \cdot 7Al_2O_3 \cdot CaF_2$ phase and 30 – 50 percent by weight of $3CaO \cdot SiO_2$ solid solution phase as the main mineral composition thereof.

2. A rapid hardening cement clinker claimed in claim 1, in which lower than 3 percent by weight of $Fe_2O_3$ are comprised in addition to said mineral compositions.

3. A process for manufacturing a rapid hardening cement clinker which consists essentially of mixing mainly an aluminous material, a calcareous material, a silicious material and a fluoride so as to make 20 – 33 percent by weight of $Al_2O_3$, 7.2 – 15.5 percent by weight of $SiO_2$, 52 – 62 percent by weight of CaO and 1.3 – 2.6 percent by wieght of F, and burning the mixture at the temperature of 1260°– 1360°C.

4. A process claimed in claim 3, in which less than 3 percent by weight of $Fe_2O_3$ in addition to said mixture present therein.

* * * * *